United States Patent
Otani et al.

(10) Patent No.: US 6,472,087 B1
(45) Date of Patent: Oct. 29, 2002

(54) ANTIREFLECTION FILM, OPTICAL ELEMENT WITH ANTIREFLECTION FILM, AND PRODUCTION METHOD OF THE ANTIREFLECTION FILM

(75) Inventors: Minoru Otani, Tokyo; Kenji Ando, Kawasaki; Yasuyuki Suzuki, Yokohama; Ryuji Biro, Kawasaki; Hidehiro Kanazawa, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/189,789

(22) Filed: Nov. 12, 1998

(30) Foreign Application Priority Data

Nov. 13, 1997 (JP) ............................................... 9-312277

(51) Int. Cl.⁷ ............................. B32B 9/00; B32B 19/00
(52) U.S. Cl. ...................... 428/696; 359/580; 359/586; 359/588; 359/589; 359/359; 428/428; 428/432; 428/696; 428/701; 428/702
(58) Field of Search ................................. 359/580, 586, 359/588, 589, 359; 428/428, 432, 696, 701, 702

(56) References Cited

U.S. PATENT DOCUMENTS 5,885,712 A * 3/1999 Otani et al. .................. 428/426
5,963,365 A * 10/1999 Shirai .......................... 359/359

FOREIGN PATENT DOCUMENTS

| JP | 61-077001 | 4/1986 |
| JP | 7-244205 | 9/1995 |
| JP | 7-244217 | 9/1995 |
| JP | 9-258006 | 10/1997 |

* cited by examiner

Primary Examiner—Deborah Jones
Assistant Examiner—Lymarie Miranda
(74) Attorney, Agent, or Firm—Fitzpatrick, Cella, Harper & Scinto (57) ABSTRACT

In order to provide an antireflection film of a wide wavelength bandwidth excellent in environment resistance performance in the ultraviolet wavelength region, the antireflection film is constructed in four-layered, or five-layered, or six-layered structure, using $Al_2O_3$ for high-index layers and $AlF_3$ or $MgF_2$ for low-index layers. Vacuum evaporation, sputtering, or CVD is used for formation of the antireflection film.

16 Claims, 6 Drawing Sheets

ANTIREFLECTION FILM, OPTICAL ELEMENT WITH ANTIREFLECTION FILM, AND PRODUCTION METHOD OF THE ANTIREFLECTION FILM

BACKGROUND OF THE INVENTION

1. Field of the Invention

The present invention relates to an antireflection film as a coating over a surface of an optical element and, more particularly, to an antireflection film effective against ultraviolet light of the wavelengths not more than 250 nm.

2. Related Background Art

The antireflection films for the ultraviolet light, using fluoride films, are described in Japanese Patent Laid-Open Application Nos. 61-77001, 7-244205, and 7-244217.

SUMMARY OF THE INVENTION

The Japanese Patent Laid-Open Application Nos. 7-244205 and 7-244217 disclose $NdF_3$, $LaF_3$, etc. as high-index fluoride films. These films, however, have a problem that they are inferior in environment resistance (characteristic stability under high temperature and high humidity environments) to oxide films such as $Al_2O_3$.

It is thus difficult to apply such films to a projection optical system using a lot of lenses like a refracting projection optical system used in exposure apparatus (so called steppers) for projecting and printing a reticle pattern onto a semiconductor wafer in a semiconductor fabrication step. In the case of the projection optical system using such many lenses, even if change is small in the antireflection characteristics of each surface due to time-dependent change, the total change of the overall projection optical system would result in a large characteristic shift.

An object of the present invention is thus to provide an antireflection film of a wide bandwidth excellent in the environment resistance performance (stability of optical characteristics with a lapse of time) in the ultraviolet wavelength region, an optical element with the antireflection film, and a method for producing the antireflection film.

The inventors found that use of $Al_2O_3$ film as a high-index film permitted production of the densest film among high-index film materials available in the ultraviolet wavelength region and considerably improved the environment resistance performance (the temporal stability of optical characteristics) of the antireflection film.

We also clarified that films of $AlF_3$ including the same metal Al were preferably used as low-index films to be alternately stacked with $Al_2O_3$ and that loss was small at the interfaces. It was also clarified that $MgF_2$ could replace $AlF_3$.

Good results were obtained when the film-forming methods were vacuum evaporation; and dense films were able to be formed by sputtering, whereby the environment resistance performance was improved. In addition, a uniform film can also be produced on a curved surface of a lens or the like by Chemical Vapor Deposition (CVD).

In view of expansion of the antireflection bandwidth and thickness errors due to manufacturing errors, an antireflection film of the present invention for accomplishing the above object is an antireflection film comprising:

an alternately multilayered film having a designed center wavelength $\lambda_0$ in a range of wavelengths 190 nm to 250 nm and comprising high-index layers of a refractive index $n_h$ and low-index layers of a refractive index $n_l$ in order from the side of a substrate to the side of air, said alternately multilayered film having a four-layered structure, wherein when a refractive index of the substrate is n, the refractive indices satisfy the following conditions;

$1.35 \leq n_l \leq 1.45$ $1.60 \leq n_h \leq 1.85$ $n_l \leq n \leq n_h$; and wherein where optical thicknesses (refractive index x geometrical thickness) of the respective layers are represented by $d_1$, $d_2$, $d_3$, and $d_4$ in order from the first layer to the fourth layer when counted from the substrate side, the first layer and the third layer are the high-index layers, the second layer and the fourth layer are the low-index layers, and the optical thicknesses satisfy the following conditions:

$0.38 \lambda_0 \leq d_1 \leq 0.43 \lambda_0$ $0.38 \lambda_0 \leq d_2 \leq 0.43 \lambda_0$ $0.20 \lambda_0 \leq d_3 \leq 0.25 \lambda_0$ $0.20 \lambda_0 \leq d_4 \leq 0.25 \lambda_0$.

Another antireflection film of the present invention is an antireflection film comprising:

an alternately multilayered film having a designed center wavelength As in a range of wavelengths 190 nm to 250 nm and comprising high-index layers of a refractive index $n_h$ and low-index layers of a refractive index $n_l$ in order from the side of a substrate to the side of air, said alternately multilayered film having a five-layered structure, wherein when a refractive index of the substrate is n, the refractive indices satisfy the following conditions;

$1.35 \leq n_l \leq 1.45$ $1.60 \leq n_h \leq 1.85$ $n_l \leq n \leq n_h$; and wherein where optical thicknesses (refractive index x geometrical thickness) of the respective layers are represented by $d_1$, $d_2$, $d_3$, $d_4$, and $d_5$ in order from the first layer to the fifth layer when counted from the substrate side, the first layer, the third layer, and the fifth layer are the low-index layers, the second layer and the fourth layer are the high-index layers, and the optical thicknesses satisfy the following conditions:

$0.42 \lambda_0 \leq d_1 \leq 0.47 \lambda_0$ $0.37 \lambda_0 \leq d_2 \leq 0.42 \lambda_0$ $0.37 \lambda_0 \leq d_3 \leq 0.42 \lambda_0$ $0.20 \lambda_0 \leq d_4 \leq 0.25 \lambda_0$ $0.20 \lambda_0 \leq d_5 \leq 0.25 \lambda_0$ Still another antireflection film of the present invention is an antireflection film comprising:

an alternately multilayered film having a designed center wavelength $\lambda_0$ in a range of wavelengths 190 nm to 250 nm and comprising high-index layers of a refractive index $n_h$ and low-index layers of a refractive index $n_l$ in order from the side of a substrate to the side of air, said alternately multilayered film having a six-layered structure, wherein when a refractive index of the substrate is n, the refractive indices satisfy the following conditions;

$1.35 \leq n_l \leq 1.45$ $1.60 \leq n_h \leq 1.85$ $n_l \leq n \leq n_h$; and wherein where optical thicknesses (refractive index × geometrical thickness) of the respective layers are represented by $d_1, d_2, d_3, d_4, d_5$, and $d_6$ in order from the first layer to the sixth layer when counted from the substrate side, the first layer, the third layer, and the fifth layer are the high-index layers, the second layer, the fourth layer, and the sixth layer are the low-index layers, and the optical thicknesses satisfy the following conditions:

$0.40\ \lambda_0 \leq d_1 \leq 0.45\ \lambda_0$ $0.37\ \lambda_0 \leq d_2 \leq 0.42\ \lambda_0$ $0.45\ \lambda_0 \leq d_3 \leq 0.50\ \lambda_0$ $0.04\ \lambda_0 \leq d_4 \leq 0.09\ \lambda_0$ $0.28\ \lambda_0 \leq d_5 \leq 0.33\ \lambda_0$ $0.20\ \lambda_0 \leq d_6 \leq 0.25\ \lambda_0$ The high-index layers are $Al_2O_3$ as described above and the low-index layers are preferably $AlF_3$ or may be $MgF_2$.

The present invention has the following effects.

(1) The present invention was able to provide the antireflection films of the wide bandwidth in the ultraviolet region by the above-stated film structures, using $Al_2O_3$ for the high-index layers and $AlF_3$ or $MgF_2$ for the low-index layers.

(2) The present invention was able to provide the antireflection films in the ultraviolet wavelength region, excellent in the environment resistance, by using $Al_2O_3$ for the high-index layers.

(3) The present invention was able to provide the antireflection films for ultraviolet light using the $Al_2O_3$ layers, which were superior in the environment resistance to those constructed only of fluoride layers.

(4) The present invention was able to provide the antireflection films for ultraviolet light of the wide bandwidth in the four-layered, five-layered, and six-layered structures by optimization of the film configuration, and the production method thereof.

DETAILED DESCRIPTION OF THE PREFERRED EMBODIMENTS

The embodiments of the present invention will be described in detail by examples, but it should be noted that the present invention is by no means intended to be limited to these examples and that the present invention involves all modifications and changes within the scope of the present invention.

EXAMPLE 1

Figure 1:
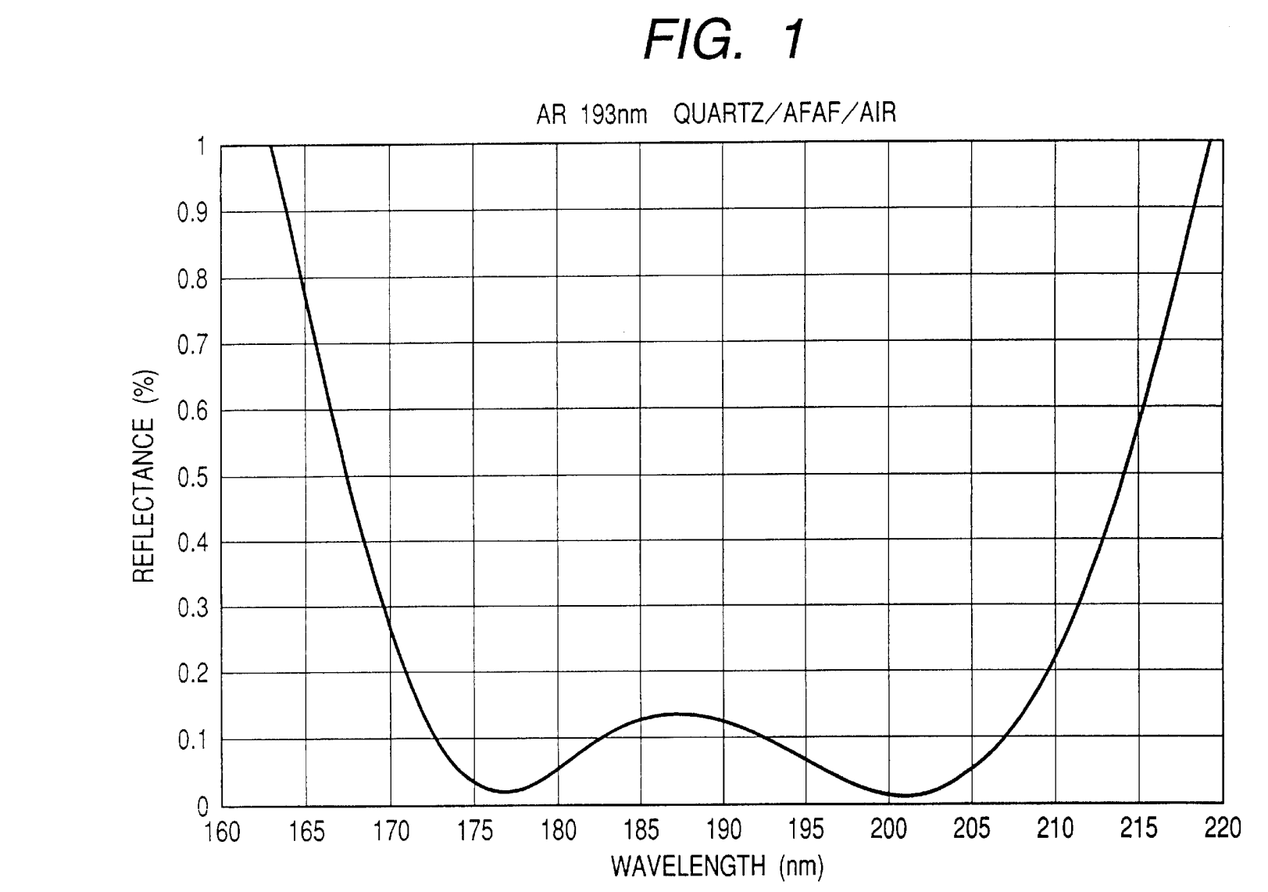
FIG. 1 is a diagram to show reflectance characteristics of the antireflection film in Example 1.

Using the high-index films of $Al_2O_3$ and the low-index films of $AlF_3$ or $MgF_2$, the antireflection film was produced in the four-layered structure as shown in Table 1 against the ultraviolet light with the designed center wavelength $\lambda_0=193$ nm. The antireflection film was produced in the thicknesses of Table 1, using a synthetic quarts substrate. Reflection characteristics of the antireflection film thus produced were measured and the results thereof are illustrated in FIG. 1. It was verified that the wavelength bandwidth of the reflectances not more than 0.2% was as wide as about 40 nm.

TABLE 1

|  | Material | Optical thickness |
| --- | --- | --- |
| Entrance medium | air |  |
| Fourth layer | $AlF_3$ or $MgF_2$ | $0.22922\ \lambda_0$ |
| Third layer | $Al_2O_3$ | $0.22353\ \lambda_0$ |
| Second layer | $AlF_3$ or $MgF_2$ | $0.41996\ \lambda_0$ |
| First layer | $Al_2O_3$ | $0.41223\ \lambda_0$ |
| Exit medium | synthetic quartz |  |

EXAMPLE 2

Figure 2:
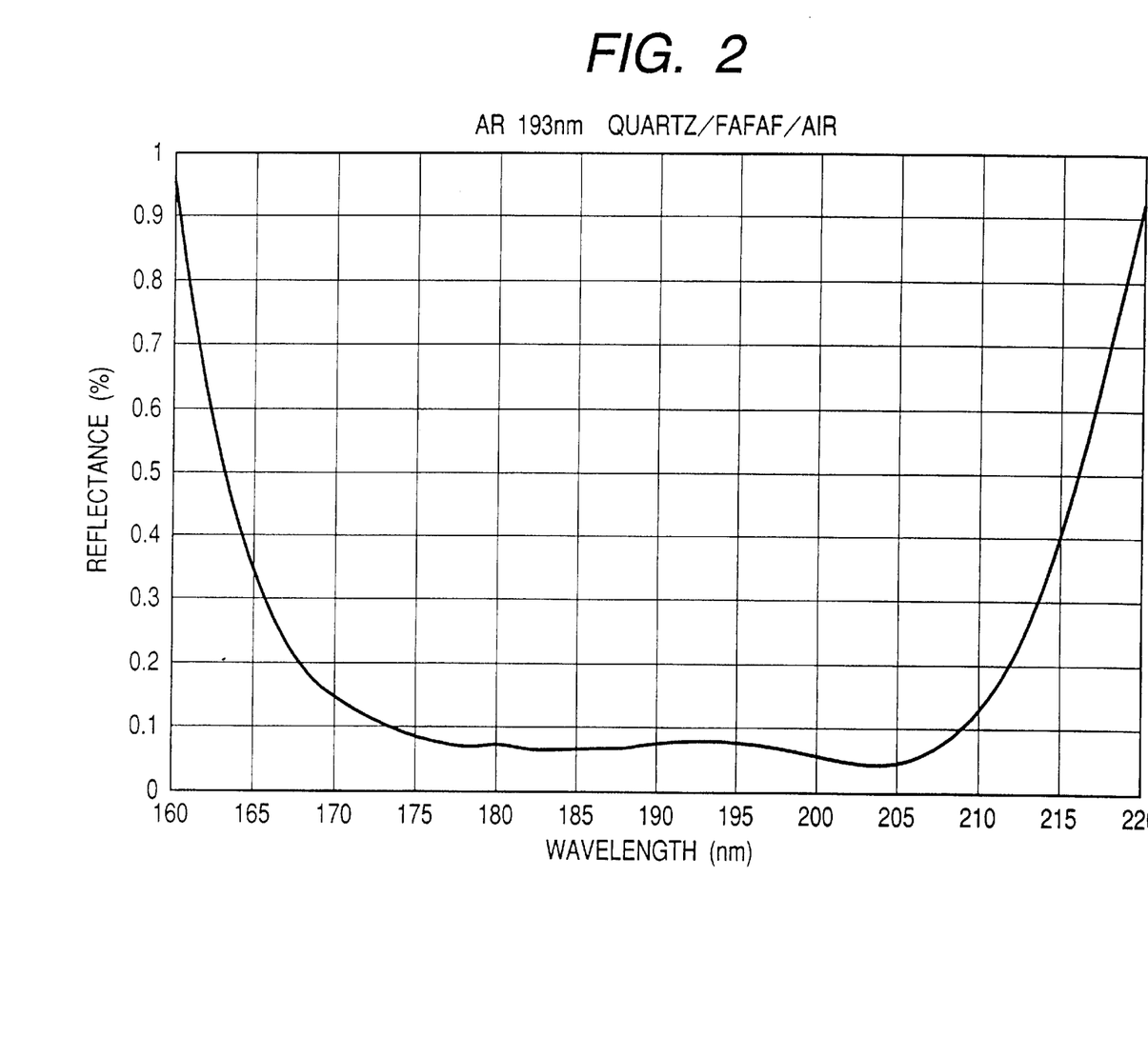
FIG. 2 is a diagram to show reflectance characteristics of the antireflection film in Example 2.

The antireflection film of the five-layered structure against the ultraviolet light with the designed center wavelength $\lambda_0=193$ nm is shown in Table 2. The antireflection film was produced in the thicknesses of Table 2, using a fluorite substrate. The reflection characteristics of the antireflection film thus produced were measured and the results thereof are shown in FIG. 2. It was verified that the film configuration whose wavelength bandwidth of the reflectances not more than 0.2% was as wide as 44 nm was able to be obtained even in the vacuum ultraviolet wavelength region of the wavelengths not more than 200 nm.

TABLE 2

|  | Material | Optical thickness |
| --- | --- | --- |
| Entrance medium | air |  |
| Fifth layer | $AlF_3$ or $MgF_2$ | $0.22515\ \lambda_0$ |
| Fourth layer | $Al_2O_3$ | $0.22707\ \lambda_0$ |
| Third layer | $AlF_3$ or $MgF_2$ | $0.39863\ \lambda_0$ |
| Second layer | $Al_2O_3$ | $0.39159\ \lambda_0$ |
| First layer | $AlF_3$ or $MgF_2$ | $0.44195\ \lambda_0$ |
| Exit medium | fluorite |  |

EXAMPLE 3

Figure 3:
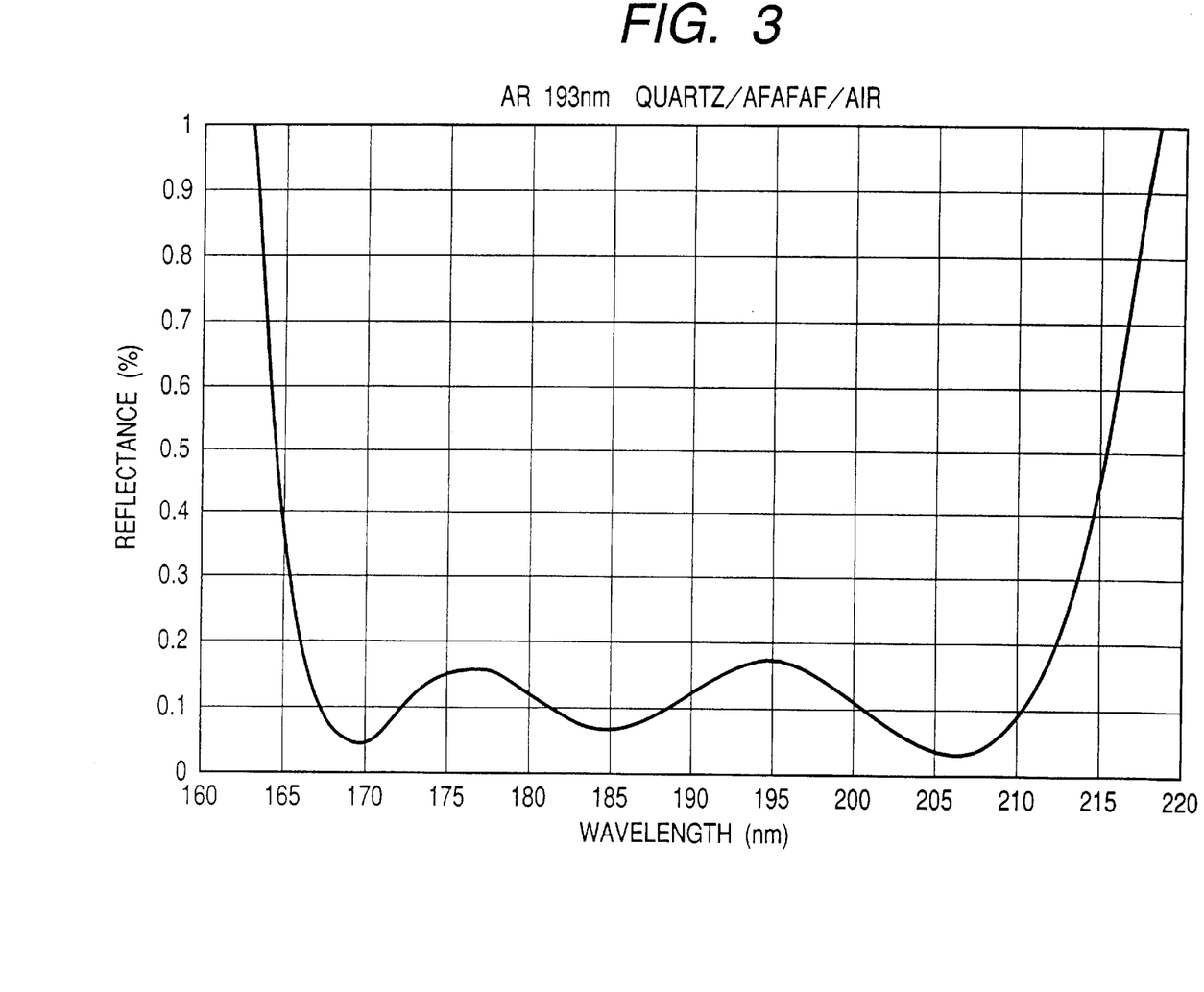
FIG. 3 is a diagram to show reflectance characteristics of the antireflection film in Example 3.

The antireflection film of the six-layered structure against the ultraviolet light with the designed center wavelength $\lambda_0=193$ nm is shown in Table 3. The antireflection film was produced in the thicknesses of Table 3, using a fluorite substrate. The reflection characteristics of the antireflection film thus produced were measured. The results of the measurement of optical characteristics of reflectance are shown in FIG. 3. It was verified that the film configuration whose wavelength bandwidth of the reflectances not more than 0.2% was as wide as 46 nm was able to be obtained even in the vacuum ultraviolet wavelength region of the wavelengths not more than 200 nm.

TABLE 3

| | Material | Optical thickness |
|---|---|---|
| Entrance medium | air | |
| Sixth layer | AlF$_3$ or MgF$_2$ | 0.23101 $\lambda_0$ |
| Fifth layer | Al$_2$O$_3$ | 0.30711 $\lambda_0$ |
| Fourth layer | AlF$_3$ or MgF$_2$ | 0.06564 $\lambda_0$ |
| Third layer | Al$_2$O$_3$ | 0.49072 $\lambda_0$ |
| Second layer | AlF$_3$ or MgF$_2$ | 0.39775 $\lambda_0$ |
| First layer | Al$_2$O$_3$ | 0.42817 $\lambda_0$ |
| Exit medium | fluorite | |

EXAMPLE 4

Figure 4:
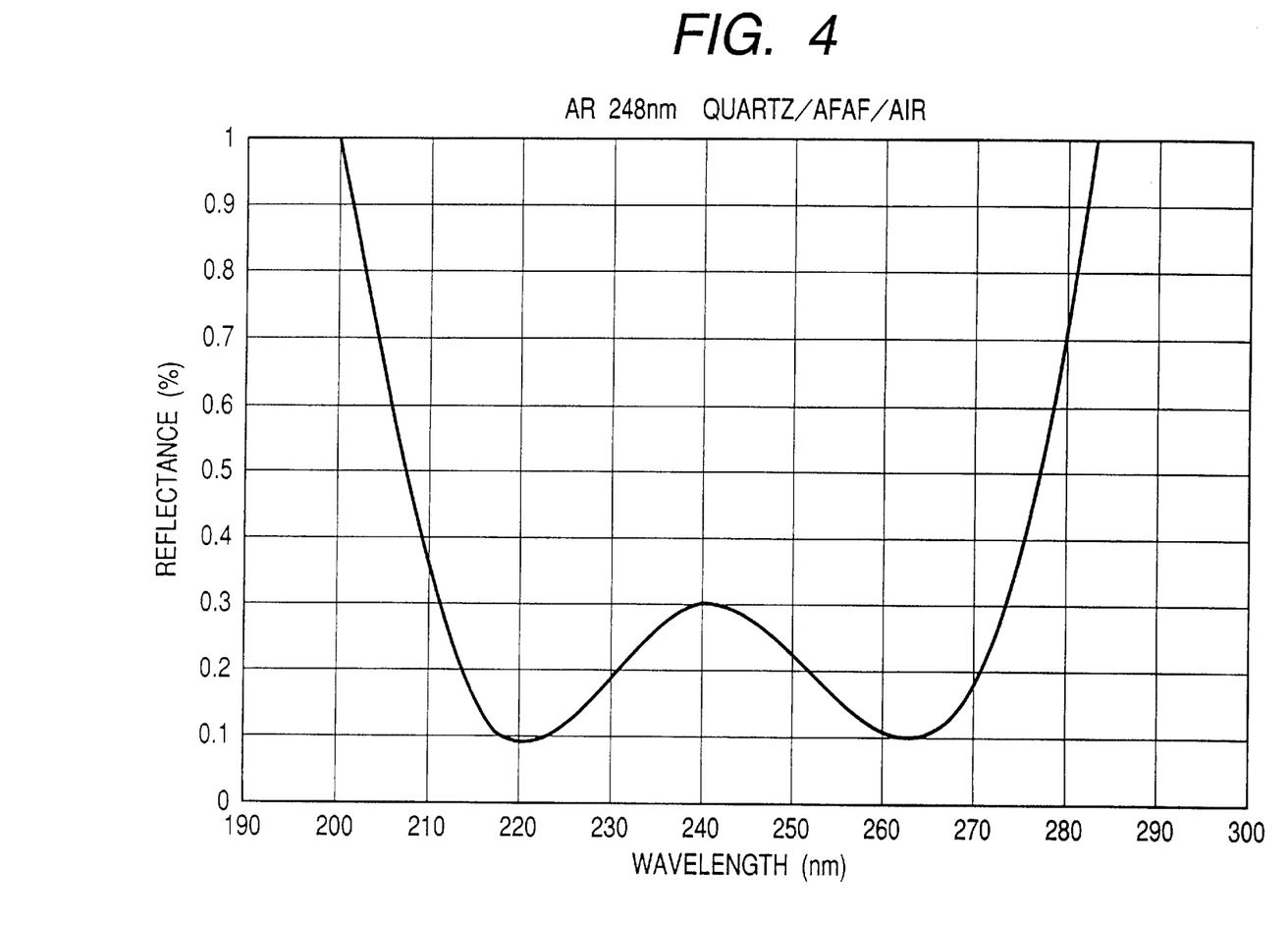
FIG. 4 is a diagram to show reflectance characteristics of the antireflection film in Example 4.

Using the high-index films of Al$_2$O$_3$ and the low-index films of AlF$_3$ or MgF$_2$, the antireflection film was produced in the four-layered structure as shown in Table 4 against the ultraviolet light with the designed center wavelength $\lambda_0$=248 nm. The antireflection film was produced in the thicknesses of Table 4, using a synthetic quarts substrate. The reflection characteristics of the antireflection film thus produced were measured. The results of the measurement of the optical characteristics of reflectance are shown in FIG. 4. It was verified that the wavelength bandwidth of the reflectances not more than 0.5% was as wide as about 70 nm.

TABLE 4

| | Material | Optical thickness |
|---|---|---|
| Entrance medium | air | |
| Fourth layer | AlF$_3$ or MgF$_2$ | 0.22449 $\lambda_0$ |
| Third layer | Al$_2$O$_3$ | 0.22232 $\lambda_0$ |
| Second layer | AlF$_3$ or MgF$_2$ | 0.41101 $\lambda_0$ |
| First layer | Al$_2$O$_3$ | 0.41048 $\lambda_0$ |
| Exit medium | synthetic quartz | |

EXAMPLE 5

Figure 5:
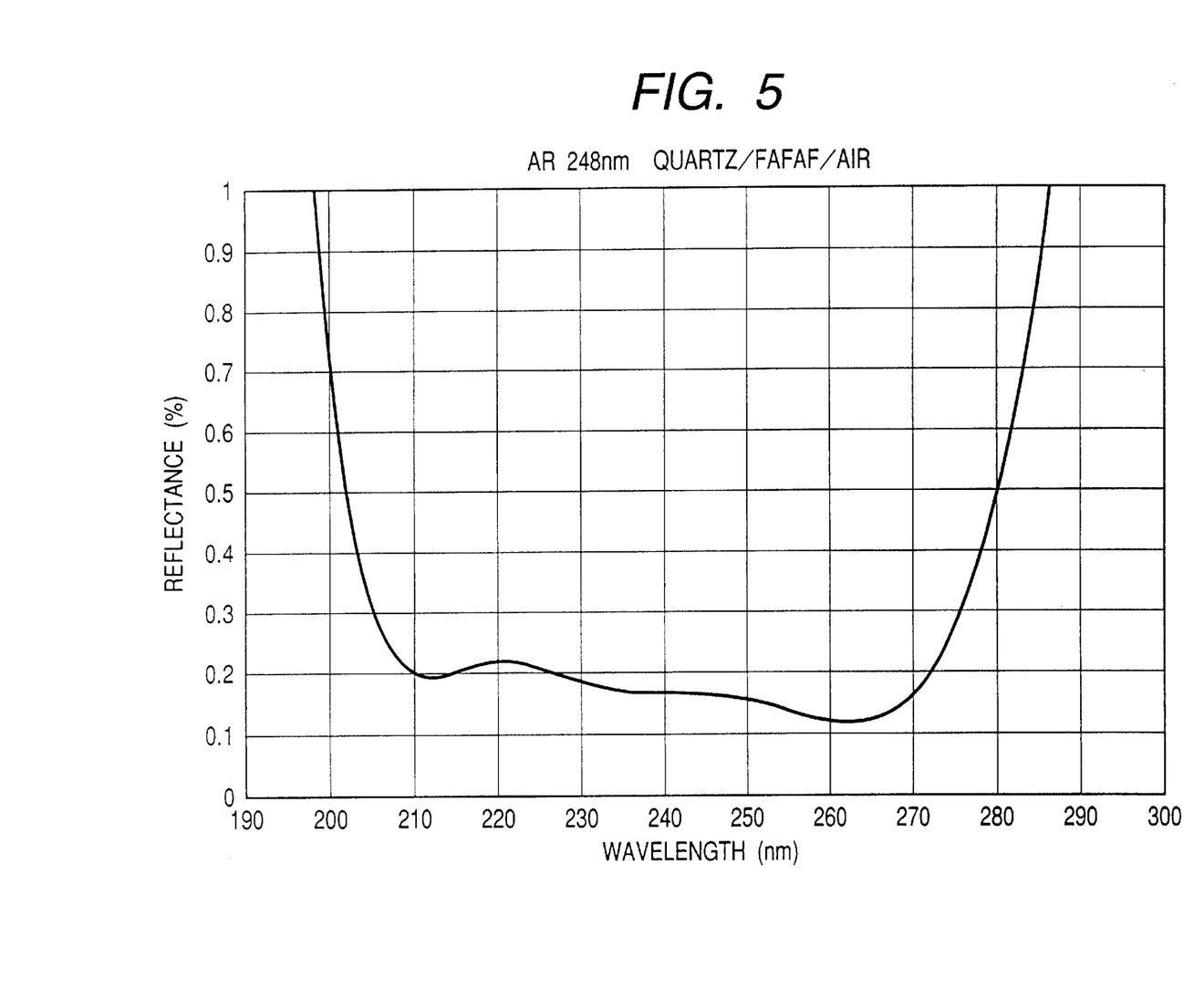
FIG. 5 is a diagram to show reflectance characteristics of the antireflection film in Example 5.

The antireflection film of the five-layered structure against the ultraviolet light with the designed center wavelength $\lambda_0$=248 nm is shown in Table 5. The antireflection film was produced in the thicknesses of Table 5, using a synthetic quartz substrate. The reflection characteristics of the antireflection film thus produced were measured. The results of the measurement of the optical characteristics of reflectance are shown in FIG. 5. It was verified that the film configuration whose wavelength bandwidth of the reflectances not more than 0.5% was as wide as 80 nm was able to be obtained even in the ultraviolet wavelength region of from the wavelength 200 nm to the wavelength 300 nm.

TABLE 5

| | Material | Optical thickness |
|---|---|---|
| Entrance medium | air | |
| Fifth layer | AlF$_3$ or MgF$_2$ | 0.22401 $\lambda_0$ |
| Fourth layer | Al$_2$O$_3$ | 0.22444 $\lambda_0$ |
| Third layer | AlF$_3$ or MgF$_2$ | 0.38959 $\lambda_0$ |
| Second layer | Al$_2$O$_3$ | 0.39518 $\lambda_0$ |
| First layer | AlF$_3$ or MgF$_2$ | 0.45239 $\lambda_0$ |
| Exit medium | synthetic quartz | |

EXAMPLE 6

Figure 6:
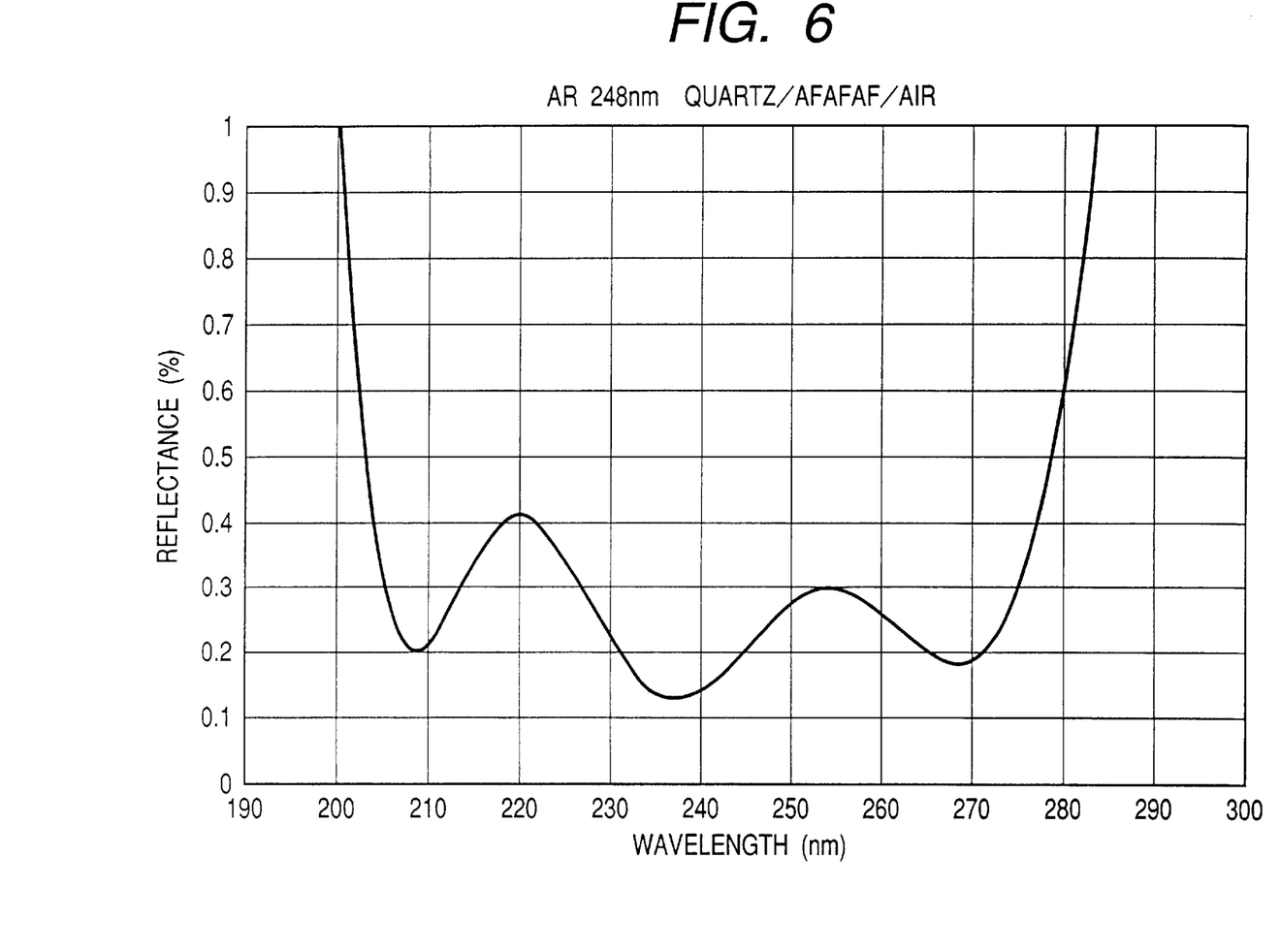
FIG. 6 is a diagram to show reflectance characteristics of the antireflection film in Example 6.

The antireflection film of the six-layered structure against the ultraviolet light with the designed center wavelength $\lambda_0$=248 nm is shown in Table 6. The antireflection film was produced in the thicknesses of Table 6, using a synthetic quartz substrate. The reflection characteristics of the antireflection film thus produced were measured. The results of the measurement of the optical characteristics of reflectance are shown in FIG. 6. It was verified that the film configuration whose wavelength bandwidth of the reflectances not more than 0.2% was as wide as 80 nm was able to be obtained even in the ultraviolet wavelength region of from the wavelength 200 nm to the wavelength 300 nm.

TABLE 6

| | Material | Optical thickness |
|---|---|---|
| Entrance medium | air | |
| Sixth layer | AlF$_3$ or MgF$_2$ | 0.23036 $\lambda_0$ |
| Fifth layer | Al$_2$O$_3$ | 0.30467 $\lambda_0$ |
| Fourth layer | AlF$_3$ or MgF$_2$ | 0.06419 $\lambda_0$ |
| Third layer | Al$_2$O$_3$ | 0.47623 $\lambda_0$ |
| Second layer | AlF$_3$ or MgF$_2$ | 0.40485 $\lambda_0$ |
| First layer | Al$_2$O$_3$ | 0.43151 $\lambda_0$ |
| Exit medium | synthetic quartz | |

EXAMPLE 7

The antireflection films of Examples 1 to 6 were produced by vacuum evaporation and sputtering.

The vacuum evaporation was carried out as follows. The evaporation chamber was evacuated down to the vacuum of $10^{-5}$ Pa or less and thereafter evaporation was carried out for deposition of Al$_2$O$_3$ with an electron gun while introducing oxygen gas at about 20 sccm and for deposition of AlF$_3$ or MgF$_2$ by resistance heating under a high vacuum condition. The substrate was heated at the substrate temperature of 200° C. or more.

The sputtering was carried out as follows. Using a 99.999% aluminum target, the sputtering was conducted with a process gas mainly containing oxygen gas for deposition of Al$_2$O$_3$ and with mixed gases of Xe and NF$_3$ for deposition of AlF$_3$. The deposition of AlF$_3$ can also be performed with either one selected from other inert gases such as Ar or He, and fluorine-based gases such as CF$_4$, or F$_2$ gas diluted with an inert gas. Therefore, the antireflection films can be produced by only switching of the gases with the single target.

Comparative Example

For comparing the antireflection films of Tables 1 to 6 (group A) with antireflection films using only the fluoride films of LaF$_3$ or NdF$_3$ instead of Al$_2$O$_3$ (group B), they were kept under circumstances of 60° C. and relative humidity 90% for 1000 hours and they were compared as to appearance and adhesion. From the results of the experiments where the films were kept under the circumstances of 60° C. and relative humidity 90% for 1000 hours, it was verified that all the antireflection films of group B showed clouding or peeling-off in the appearance and were also inferior in the adhesion of tape tests to those of group A.

What is claimed is:

1. An antireflection film consisting of:
   an alternately multilayered film having a designed center wavelength $\lambda_0$ in a range of wavelengths 190 nm to 250 nm and comprising high-index layers of a refractive index $n_h$ and low-index layers of a refractive index $n_l$ in order from the side of a substrate to the side of air, said alternately multilayered film having a four layered structure, wherein when a refractive index of the substrate is n, the refractive indices satisfy the following conditions:

$$1.35 \leq n_l \leq 1.45$$

$$1.60 \leq n_h \leq 1.85$$

$$n_l \leq n \leq n_h; \text{ and}$$

wherein when optical thicknesses (refractive index x geometrical thickness) of the respective layers are represented by $d_1$, $d_2$, $d_3$, and $d_4$ in order from the first layer to the fourth layer when counted from the substrate side, the first layer and the third layer are the high-index layers, the second layer and the fourth layer are the low-index layers, and the optical thicknesses satisfy the following conditions:

$$0.38 \lambda_0 \leq d_1 \leq 0.43 \lambda_0$$

$$0.38 \lambda_0 \leq d_2 \leq 0.43 \lambda_0$$

$$0.20 \lambda_0 \leq d_3 \leq 0.25 \lambda_0$$

$$0.20 \lambda_0 \leq d_4 \leq 0.25 \lambda_0.$$

2. An antireflection film comprising:

an alternately multilayered film having a designed center wavelength $\lambda_0$ in a range of wavelengths 190 nm to 250 nm and comprising high-index layers of a refractive index $n_h$ and low-index layers of a refractive index $n_l$ in order from the side of a substrate to the side of air, said alternately multilayered film having a five-layered structure, wherein when a refractive index of the substrate is n, the refractive indices satisfy the following conditions;

$$1.35 \leq n_l \leq 1.45$$

$$1.60 \leq n_h \leq 1.85$$

$$n_l \leq n \leq n_h; \text{ and}$$

wherein where optical thicknesses (refractive index x geometrical thickness) of the respective layers are represented by $d_1$, $d_2$, $d_3$, $d_4$, and $d_5$ in order from the first layer to the fifth layer when counted from the substrate side, the first layer, the third layer, and the fifth layer are the low-index layers, the second layer and the fourth layer are the high-index layers, and the optical thicknesses satisfy the following conditions:

$$0.42 \lambda_0 \leq d_1 \leq 0.47 \lambda_0$$

$$0.37 \lambda_0 \leq d_2 \leq 0.42 \lambda_0$$

$$0.37 \lambda_0 \leq d_3 \leq 0.42 \lambda_0$$

$$0.20 \lambda_0 \leq d_4 \leq 0.25 \lambda_0$$

$$0.20 \lambda_0 \leq d_5 \leq 0.25 \lambda_0.$$

3. An antireflection film comprising:

an alternately multilayered film having a designed center wavelength $\lambda_0$ in a range of wavelengths 190 nm to 250 nm and comprising high-index layers of a refractive index $n_h$ and low-index layers of a refractive index $n_l$ in order from the side of a substrate to the side of air, said alternately multilayered film having a six-layered structure, wherein when a refractive index of the substrate is n, the refractive indices satisfy the following conditions;

$$1.35 \leq n_l \leq 1.45$$

$$1.60 \leq n_h \leq 1.85$$

$$n_l \leq n \leq n_h; \text{ and}$$

wherein where optical thicknesses (refractive index x geometrical thickness) of the respective layers are represented by $d_1$, $d_2$, $d_3$, $d_4$, $d_5$, and $d_6$ in order from the first layer to the sixth layer when counted from the substrate side, the first layer, the third layer, and the fifth layer are the high-index layers, the second layer, the fourth layer, and the sixth layer are the low-index layers, and the optical thicknesses satisfy the following conditions:

$$0.40 \lambda_0 \leq d_1 \leq 0.45 \lambda_0$$

$$0.37 \lambda_0 \leq d_2 \leq 0.42 \lambda_0$$

$$0.45 \lambda_0 \leq d_3 \leq 0.50 \lambda_0$$

$$0.04 \lambda_0 \leq d_4 \leq 0.09 \lambda_0$$

$$0.28 \lambda_0 \leq d_5 \leq 0.33 \lambda_0$$

$$0.20 \lambda_0 \leq d_6 \leq 0.25 \lambda_0.$$

4. The antireflection film according to any one of claims 1 to 3, wherein said high-index layers are layers comprising a principal component of $Al_2O_3$ and said low-index layers are layers comprising a principal component of $MgF_2$ or $AlF_3$.

5. An optical element for use in projecting a rectile pattern onto a semiconductor wafer, wherein said element is coated with an antireflection film comprised of an alternately multilayered film having a center wavelength $\lambda_O$ in the range of 190 nm to 250 nm and comprised of high-index layers of a refractive index $n_h$, composed of $Al_2O_3$ as the principal component, and low-index layers of a refractive index $n_l$, composed of $MgF_2$ or $AlF_3$ as the principal component, in that order, from the side of a substrate to the side of air, the alternately multilayered film having a four-layered structure, wherein when the substrate has a refractive index n, the other said refractive indices satisfy the following conditions:

$$1.35 \leq n_l \leq 1.45,$$

$$1.60 \leq n_h \leq 1.85, \text{ and}$$

$$n_l \leq n \leq n_h; \text{ and}$$

wherein when the optical thicknesses (refractive index x geometrical thickness) of the respective layers are represented by $d_1$, $d_2$, $d_3$, and $d_4$, in order from the first layer to the fourth layer when counted from the substrate side, the first layer and the third layer are the high-index layers, the second layer and the fourth layer are the low-index layers, and said optical thicknesses satisfy the following conditions:

$$0.38 \lambda_O \leq d_1 \leq 0.43 \lambda_O$$

$$0.38 \lambda_O \leq d_2 \leq 0.43 \lambda_O,$$

$$0.20 \lambda_O \leq d_3 \leq 0.25 \lambda_O,$$

$$0.20 \lambda_O \leq d_4 \leq 0.25 \lambda_O.$$

6. An optical element for use in projecting a rectile pattern onto a semiconductor wafer, wherein said element is coated with an antireflection film comprised of an alternately multilayered film having a center wavelength $\lambda_O$ in the range of 190 nm to 250 nm and comprised of high-index layers of a refractive index $n_h$, composed of $Al_2O_3$ as the principal component, and low-index layers of a refractive index $n_l$, composed of $MgF_2$ or $AlF_3$ as the principal component, in that order, from the side of a substrate to the side of air, the alternately multilayered film having a five-layered structure, wherein when the substrate has a refractive index n, the other said refractive indices satisfy the following conditions:

$1.35 \leq n_l \leq 1.45$, $1.60 \leq n_h \leq 1.85$, and $n_l \leq n \leq n_h$; and wherein when the optical thicknesses (refractive index x geometrical thickness) of the respective layers are represented by $d_1$, $d_2$, $d_3$, $d_4$, and $d_5$, in order from the first layer to the fifth layer when counted from the substrate side, the first layer, the third layer, and the fifth layer are the low-index layers, the second layer and the fourth layer are the high-index layers, and said optical thicknesses satisfy the following conditions:

$0.42 \lambda_O \leq d_1 \leq 0.47 \lambda_O$, $0.37 \lambda_O \leq d_2 \leq 0.42 \lambda_O$, $0.37 \lambda_O \leq d_3 \leq 0.42 \lambda_O$, $0.20 \lambda_O \leq d_4 \leq 0.25 \lambda_O$, and $0.20 \lambda_O \leq d_5 \leq 0.25 \lambda_O$.

7. An optical element for use in projecting a rectile pattern onto a semiconductor wafer, wherein said element is coated with an antireflection film comprised of an alternately multilayered film having a center wavelength $\lambda_O$ in the range of 190 nm to 250 nm and comprised of high-index layers of a refractive index $n_h$, composed of $Al_2O_3$ as the principal component, and low-index layers of a refractive index $n_l$, composed of $MgF_2$ or $AlF_3$ as the principal component, in that order, from the side of a substrate to the side of air, the alternately multilayered film having a six-layered structure, wherein when the substrate has a refractive index of n, the other said refractive indices satisfy the following conditions:

$1.35 \leq n_l \leq 1.45$, $1.60 \leq n_h \leq 1.85$, $n_l \leq n \leq n_h$; and wherein when the optical thicknesses (refractive index x geometrical thickness) of the respective layers are represented by $d_1$, $d_2$, $d_3$, $d_4$, $d_5$, and $d_6$, in order from the first layer to the sixth layer when counted from the substrate side, the first layer, the third layer, and the fifth layer are the high-index layers, the second layer, the fourth layer, and the sixth layer are the low-index layers, and said optical thicknesses satisfy the following conditions:

$0.40 \lambda_O \leq d_1 \leq 0.45 \lambda_O$, $0.37 \lambda_O \leq d_2 \leq 0.42 \lambda_O$, $0.45 \lambda_O \leq d_3 \leq 0.50 \lambda_O$, $0.04 \lambda_O \leq d_4 \leq 0.09 \lambda_O$, $0.28 \lambda_O \leq d_5 \leq 0.33 \lambda_O$, and $0.20 \lambda_O \leq d_6 \leq 0.25 \lambda_O$.

8. A method for producing a four-layered antireflection film having a center wavelength $\lambda_O$ comprising the sequential steps of
(a) selecting a desired center wavelength for the film in the range of 190 nm to 250 nm;
(b) depositing by vacuum evaporation on a substrate having a refractive index of n a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.38 \lambda_O$ to $0.43 \lambda_O$;
(c) depositing by vacuum evaporation on said first high-index layer a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.38 \lambda_O$ to $0.43 \lambda_O$;
(d) depositing by vacuum evaporation on said first low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.20 \lambda_O$ to $0.25 \lambda_O$; and
(e) depositing by vacuum evaporation on said second high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of 0.20 to $0.25 \lambda_O$.

9. A method for producing a five-layered antireflection film having a center wavelength $\lambda_O$ comprising the sequential steps of
(a) selecting a desired center wavelength for the film in the range of 190 nm to 250 nm;
(b) depositing by vacuum evaporation on a substrate having a refractive index of n a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.42 \lambda_O$ to $0.47 \lambda_O$;
(c) depositing by vacuum evaporation on said first low-index layer a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.37 \lambda_O$ to $0.42 \lambda_O$;
(d) depositing by vacuum evaporation on said first high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.37 \lambda_0$ to $0.42 \lambda_O$;

(e) depositing by vacuum evaporation on said second low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.20 \lambda_O$ to $0.25 \lambda_O$; and (f) depositing by vacuum evaporation on said second high-index layer a third low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.20 \lambda_O$ to $0.25 \lambda_O$.

10. A method for producing a six-layered antireflection film having a center wavelength $\lambda_O$ comprising the sequential steps of (a) selecting a desired center wavelength for the film in the range of 190 nm to 250 nm;

(b) depositing by vacuum evaporation on a substrate having a refractive index of n a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.40 \lambda_O$ to $0.45 \lambda_O$;

(c) depositing by vacuum evaporation on said first high-index layer a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.37 \lambda_O$ to $0.42 \lambda_O$;

(d) depositing by vacuum evaporation on said first low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.45 \lambda_O$ to $0.50 \lambda_O$;

(e) depositing by vacuum evaporation on said second high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of 0.04 to $0.09 \lambda_O$;

(f) depositing by vacuum evaporation on said second low-index layer a third high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.28 \lambda_O$ to $0.33 \lambda_O$; and (g) depositing by vacuum evaporation on said third high-index layer a third low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of 0.20 to $0.25 \lambda_O$.

11. A method for producing a four-layered antireflection film having a center wavelength $\lambda_O$ comprising the sequential steps of (a) selecting a desired center wavelength for the film in the range of 190 nm to 250 nm;

(b) depositing, by sputtering using an aluminum target and a gas containing mainly oxygen, on a substrate having a refractive index of n, a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.38 \lambda_O$ to $0.43 \lambda_O$;

(c) depositing, by sputtering using an aluminum target and a mixture of an inert gas selected from Ar, He, and Xe and a fluorine-based gas selected from $NF_3$, $CF_4$ and $F_2$, on said first high-index layer a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.38 \lambda_O$ to $0.43 \lambda_O$;

(d) depositing, by sputtering using an aluminum target and a gas containing mainly oxygen, on said first low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.20 \lambda_O$ to $0.25 \lambda_O$; and (e) depositing, by sputtering using an aluminum target and a mixture of an inert gas selected from Ar, He, and Xe and a fluorine-based gas selected from $NF_3$, $CF_4$ and $F_2$, on said second high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.20 \lambda_O$ to $0.25 \lambda_O$.

12. A method for producing a five-layered antireflection film having a center wavelength $\lambda_O$ comprising the sequential steps of (a) selecting a desired center wavelength for the film in the range of 190 nm to 250 nm;

(b) depositing, by sputtering using an aluminum target and a mixture of an inert gas selected from Ar, He, and Xe and a fluorine-based gas selected from $NF_3$, $CF_4$ and $F_2$, on a substrate having a refractive index of n a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.42 \lambda_O$ to $0.47 \lambda_O$;

(c) depositing, by sputtering using an aluminum target and a gas containing mainly oxygen, on said first low-index layer a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.37 \lambda_O$ to $0.42 \lambda_O$;

(d) depositing, by sputtering using an aluminum target and a mixture of an inert gas selected from Ar, He, and Xe and a fluorine-based gas selected from $NF_3$, $CF_4$ and F$_2$, on said first high-index layer a second low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.37 $\lambda_O$ to 0.42 $\lambda_O$;

(e) depositing, by sputtering using an aluminum target and a gas containing mainly oxygen, on said second low-index layer a second high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.20 to 0.25 $\lambda_O$; and (f) depositing, by sputtering using an aluminum target and a mixture of an inert gas selected from Ar, He, and Xe and a fluorine-based gas selected from NF$_3$, CF$_4$ and F$_2$, on said second high-index layer a third low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.20 $\lambda_O$ to 0.25 $\lambda_O$.

13. A method for producing a six-layered antireflection film having a center wavelength $\lambda_O$ comprising the sequential steps of (a) selecting a desired center wavelength for the film in the range of 190 nm to 250 nm;

(b) depositing, by sputtering using an aluminum target and a gas containing mainly oxygen, on a substrate having a refractive index of n a first high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.40 $\lambda_O$ to 0.45 $\lambda_O$;

(c) depositing, by sputtering using an aluminum target and a mixture of an inert gas selected from Ar, He, and Xe and a fluorine-based gas selected from NF$_3$, CF$_4$ and F$_2$, on said first high-index layer a first low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.37 $\lambda_O$ to 0.42 $\lambda_O$;

(d) depositing, by sputtering using an aluminum target and a gas containing mainly oxygen, on said first low-index layer a second high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.45 $\lambda_O$ to 0.50 $\lambda_O$;

(e) depositing, by sputtering using an aluminum target and a mixture of an inert gas selected from Ar, He, and Xe and a fluorine-based gas selected from NF$_3$, CF$_4$ and F$_2$, on said second high-index layer a second low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.04 to 0.09 $\lambda_O$;

(f) depositing, by sputtering using an aluminum target and a gas containing mainly oxygen, on said second low-index layer a third high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.28 $\lambda_O$ to 0.33 $\lambda_O$; and (g) depositing, by sputtering using an aluminum target and a mixture of an inert gas selected from Ar, He, and Xe and a fluorine-based gas selected from NF$_3$, CF$_4$ and F$_2$, on said third high-index layer a third low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.20 to 0.25 $\lambda_O$.

14. A method for producing a four-layered antireflection film having a center wavelength $\lambda_O$ comprising the sequential steps of (a) selecting a desired center wavelength for the film in the range of 190 nm to 250 nm;

(b) depositing by chemical vapor deposition on a substrate having a refractive index of n a first high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.38 $\lambda_O$ to 0.43 $\lambda_O$;

(c) depositing by chemical vapor deposition on said first high-index layer a first low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.38 $\lambda_O$ to 0.43 $\lambda_O$;

(d) depositing by chemical vapor deposition on said first low-index layer a second high-index layer composed of Al$_2$O$_3$ as the principal component, said high-index layer having a refractive index that is equal to or greater than n and is within the range of 1.60 to 1.85, and having an optical thickness (refractive index x geometrical thickness) in the range of 0.20 $\lambda_O$ to 0.25 $\lambda_O$; and (e) depositing by chemical vapor deposition on said second high-index layer a second low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.20 to 0.25 $\lambda_O$.

15. A method for producing a five-layered antireflection film having a center wavelength $\lambda_O$ comprising the sequential steps of (a) selecting a desired center wavelength for the film in the range of 190 nm to 250 nm;

(b) depositing by chemical vapor deposition on a substrate having a refractive index of n a first low-index layer composed of MgF$_2$ or AlF$_3$ as the principal component, said low-index layer having a refractive index that is equal to or less than n and is within the range of 1.35 to 1.45, and having an optical thickness (refractive index x geometrical thickness) in the range of 0.42 $\lambda_O$ to 0.47 $\lambda_O$;

(c) depositing by chemical vapor deposition on said first low-index layer a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.37 \lambda_O$ to $0.42 \lambda_O$;

(d) depositing by chemical vapor deposition on said first high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.37 \lambda_O$ to $0.42 \lambda_O$;

(e) depositing by chemical vapor deposition on said second low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of 0.20 to $0.25 \lambda_O$; and (f) depositing by chemical vapor deposition on said second high-index layer a third low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.20 \lambda_O$ to $0.25 \lambda_O$.

16. A method for producing a six-layered antireflection film having a center wavelength $\lambda_O$ comprising the sequential steps of (a) selecting a desired center wavelength for the film in the range of 190 nm to 250 nm;

(b) depositing by chemical vapor deposition on a substrate having a refractive index of n a first high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.40 \lambda_O$ to $0.45 \lambda_O$;

(c) depositing by chemical vapor deposition on said first high-index layer a first low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of $0.37 \lambda_O$ to $0.42 \lambda_O$;

(d) depositing by chemical vapor deposition on said first low-index layer a second high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.45 \lambda_O$ to $0.50 \lambda_O$;

(e) depositing by chemical vapor deposition on said second high-index layer a second low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of 0.04 to $0.09 \lambda_O$;

(f) depositing by chemical vapor deposition on said second low-index layer a third high-index layer composed of $Al_2O_3$ as the principal component, said high-index layer having a refractive index that is equal to or greater than n and is within the range of 1.60 to 1.85, and having an optical thickness (refractive index x geometrical thickness) in the range of $0.28 \lambda_O$ to $0.33 \lambda_O$; and (g) depositing by chemical vapor deposition on said third high-index layer a third low-index layer composed of $MgF_2$ or $AlF_3$ as the principal component, said low-index layer having a refractive index that is equal to or less than n and is within the range of 1.35 to 1.45, and having an optical thickness (refractive index x geometrical thickness) in the range of 0.20 to $0.25 \lambda_O$.

* * * * *

UNITED STATES PATENT AND TRADEMARK OFFICE
CERTIFICATE OF CORRECTION

PATENT NO. : 6,472,087 B1
DATED : October 29, 2002
INVENTOR(S) : Minoru Otani et al.

It is certified that error appears in the above-identified patent and that said Letters Patent is hereby corrected as shown below:

Column 2,
Line 29, "As" should read -- $\lambda_0$ --.

Column 4,
Line 12, "quarts" should read -- quartz --.

Column 5,
Line 21, "quarts" should read -- quartz --.

Column 6,
Line 67, "four layered" should read -- four-layered --.

Column 7,
Lines 34 and 67, "conditions;" should read -- conditions: --.

Column 8,
Lines 31 and 65, "rectile" should read -- reticle --.

Column 9,
Line 33, "rectile" should read -- reticle --.

Signed and Sealed this

Eighth Day of April, 2003

JAMES E. ROGAN
*Director of the United States Patent and Trademark Office*